(12) United States Patent
Semenov et al.

(10) Patent No.: US 6,180,919 B1
(45) Date of Patent: Jan. 30, 2001

(54) METHOD FOR MAKING A WELDED JOINT

(75) Inventors: Viktor Nikonorovich Semenov; Margarita Borisovna Pestova, both of Moskovskaya oblast; Gennady Grigorievich Derkach, Moscow; Anatoly Lukich Loginov; Oleg Andreevich Masljukov, both of Moskovskaya oblast, all of (RU)

(73) Assignee: Otkrytoe Aktsionernoe Obschestvo "Nauchno-Proizvodstvennoe Obiedinenie "Energomash"Imeni Akademika V.P. Glushko", Moskovskaya oblast (RU)

( * ) Notice: Under 35 U.S.C. 154(b), the term of this patent shall be extended for 0 days.

(21) Appl. No.: 09/391,868

(22) Filed: Sep. 8, 1999

(30) Foreign Application Priority Data

Feb. 4, 1999 (RU) .................................. 99102180

(51) Int. Cl.⁷ ....................................................... B23K 9/23
(52) U.S. Cl. ..................................................... 219/137 WM
(58) Field of Search .................... 219/137 WM, 219/137 R, 74, 75

(56) References Cited

U.S. PATENT DOCUMENTS 3,288,981 * 11/1966 Mabry et al. ................ 219/137 WM

FOREIGN PATENT DOCUMENTS

| 58-009779 | 1/1983 | (JP) . |
| 336111 | 9/1972 | (SU) . |

* cited by examiner

Primary Examiner—Clifford C. Shaw
(74) Attorney, Agent, or Firm—Christie, Parker & Hale, LLP

(57) ABSTRACT

The invention relates to the field of welding, more particularly, to methods of making welded joints for pieces of maraging steels, and may be used in different branches of machine building.

Before welding, an intermediate element is resistance spot welded to one of the welded edges. The element is made of the product's material and covered with a layer of chromium. The joint is fit up by tacks on a weld backing made of the same material as the product. The tacks are made by a manual argon-arc welding by a nonconsumable electrode. The joint is argon-arc welded by two runs of a nonconsumable electrode at transverse oscillations of the same.

6 Claims, 1 Drawing Sheet

METHOD FOR MAKING A WELDED JOINT

FIELD OF THE INVENTION

The invention relates to the field of welding, more particularly, to a method of making welded joints for products of maraging steels, and can find application in manufacturing various components in the rocket and aircraft industry and other engineering branches.

BACKGROUND OF THE INVENTION

A method for welding high-strength alloys, comprising welding an insert between the pieces jointed, is known in the art (SU Inventor's Certificate No. 336111, B 23 K 9/02, 1972).

However, in this case the insert is made of a material having a less strength than that of the material of the welded pieces, resulting in the reduced strength of the welded joint as a whole.

Most closely approaching the present invention is a method for making a welded joint, comprising the steps of resistance welding a thin metal backing of the same metal as that of a filling wire to an edge of one of pieces welded, fitting up a joint, and welding at a constant current of opposite polarity (JP Application No. 58-9779, B 23 K 9/23, published in 1983).

The method permits obtaining high-quality joints in products made of heat-resistant stainless steels and carbon steels. However, there exist a number of structures of maraging steels that could not be welded by the prior art method without cracks.

SUMMARY OF THE INVENTION

It is an object of the invention to provide an improvement in quality of a welded joint for components made of maraging steels.

A method in accordance with the invention provides a welded joint free of the shrinkage and cold cracks when welding pieces of maraging steels.

The object of the invention is achieved in a method of making a welded joint, comprising the steps of resistance spot welding an intermediate element to an edge of one of pieces welded, fitting up the welded pieces and welding, wherein the intermediate element is made of the same metal as that of the welded pieces and covered with a layer of chromium, said fitting up of the pieces is made by tacking using a manual argon-arc welding with a nonconsumable electrode on a kept weld backing of the same metal as that of the pieces, the argon-arc welding is accomplished at a nonrotatable position of the pieces by two runs of a nonconsumable electrode at transverse oscillations of the electrode relative to the weld at a frequency of 60–80 oscillations per minute, a first run being made at a reduced welding current comprising 30–70% of a rated current. When welding ring joints, a second run is made in two half-turns of downhill welding with overlapping of the beginning and the end of the weld.

The method procedure can be studied with reference to welding a pipeline to a stator body and a generator body of a liquid-propellant rocket engine as an example. The welded components are made of a maraging steel.

DETAILED DESCRIPTION OF THE PREFERRED EMBODIMENTS

Figure 1:
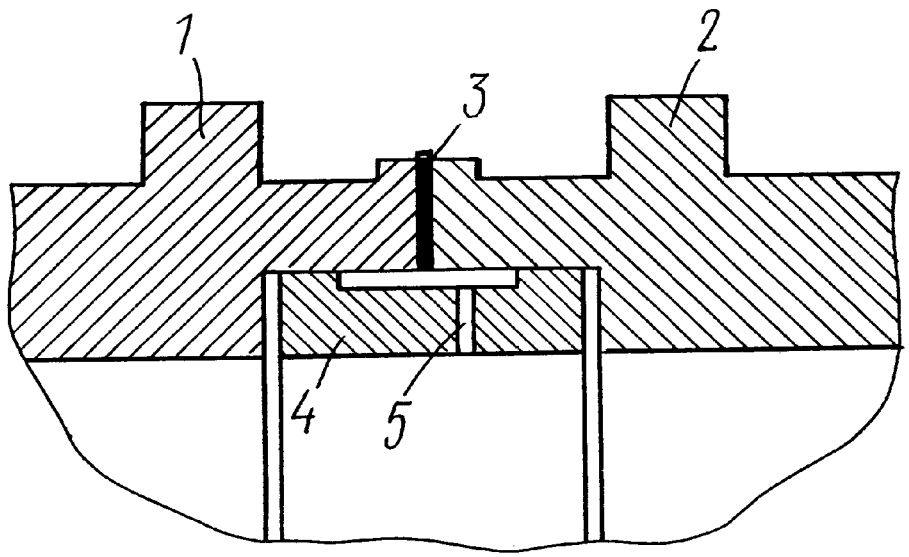
FIG. 1 is the schematic view of a welded structure in accordance with the invention.
Figure 2:
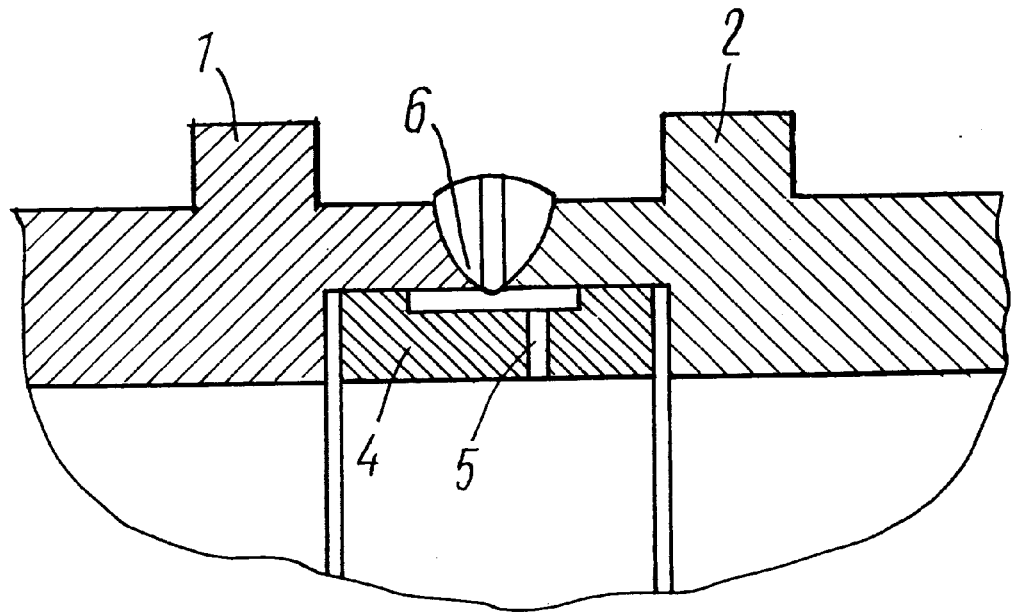
FIG. 2 is a cross-sectional view of a welded joint in accordance with the invention.

First, an intermediate ring 3 made of steel and covered with a layer of chromium with a thickness of 30 μm, was resistance spot welded to one of welded edges of steel pieces 1 or 2. The ring thickness was 0.5–0.6 mm. A joint was fit up on a kept weld backing 4 of steel by argon-arc welding using a nonconsumable electrode, an inner space of the joint being blown with argon.

After fitting-up, the joint was argon-arc welded at a stationary (nonrotatable and fixed) position of the pieces using a nonconsumable electrode, with transverse oscillations of the electrode relative to the weld being provided at a frequency of 60–80 oscillations per minute to increase the penetration depth and improve filling of the groove. The inner space of the welded joint was blown by a protective gas.

The welding was accomplished by two runs, a first run being made at a reduced welding current compared to a current strength in a second run (by 30–70%), by a constant current of opposite polarity. A second run was made by two half-turns of downhill welding. A first half-turn was started from a point that, for example, corresponded to a location of an imaginary hour hand at 1 hour, continued counter-clockwise and finished at a point corresponding to 5 hours. The second run was started at a point corresponding to 11 hours, continued clockwise and finished at a point corresponding to 7 hours. Argon was supplied from the side of the inner space during welding. A weld backing 4 made of the same metal as that of the pieces 1 and 2 was used in fitting up the pieces. Argon was fed to the weld root 6 through holes 5 in the weld backing 4.

Upon welding, the welds were X-ray tested and found to be free of cracks. After that, hydraulic test at 400–759 kgf/cm$^2$ and pneumatic test at 60 kgf/cm$^2$ using an air-helium mixture were conducted. The tests proved the absence of cracks in the weld joint.

The method for making a welded joint in accordance with the invention can find the most successful application in weld jointing the products made of maraging steels to manufacture various structures in rocket and aircraft industry and other branches of engineering.

We claim:

1. A method for making a welded joint, comprising the steps of:

resistance spot welding an intermediate element to an edge of one of pieces welded, said intermediate element being made of the same metal as that of the welded pieces, argon-arc welding the pieces together with the intermediate element with argon being fed to a weld produced, wherein said intermediate element is covered with a layer of chromium before the welding, the welded pieces are fit up with the intermediate element positioned therebetween by tacking the pieces using a manual argon-arc welding with a nonconsumable electrode on a weld backing of the same metal as that of the pieces, said argon-arc welding being made by two runs of a nonconsumable electrode at transverse oscillations of the electrode relative to said weld, keeping said weld backing after welding.

2. A method as set forth in claim 1, wherein when ring joints are welded, said argon-arc welding is made at a fixed position of the pieces.

3. A method as set forth in claim 2, wherein a second run is made by two half-turns of downhill welding, with overlapping a beginning and an end of a weld made during a first half-turn in the opposite direction.

4. A method as set forth in claim 1, wherein said transverse oscillations of the nonconsumable electrode are made at a frequency of 60–80 oscillations per minute.

5. A method as set forth in claim 1, wherein said first run is made at a reduced welding current comprising 30–70% of a current strength in the second run.

6. A method as set forth in claim 1, wherein holes are provided in said weld backing for feeding argon to a weld root therethrough.

\* \* \* \* \*